(12) United States Patent
Laudet

(10) Patent No.: US 9,434,488 B2
(45) Date of Patent: Sep. 6, 2016

(54) PACKAGING OF OBJECTS LOCATED IN ONE OR MORE LAYERS

(75) Inventor: Gerard Laudet, Rebais (FR)

(73) Assignee: TECMA PACK, Coulommiers (FR)

( * ) Notice: Subject to any disclaimer, the term of this patent is extended or adjusted under 35 U.S.C. 154(b) by 196 days.

(21) Appl. No.: 14/129,229

(22) PCT Filed: Jun. 22, 2012

(86) PCT No.: PCT/FR2012/051433
§ 371 (c)(1),
(2), (4) Date: Dec. 24, 2013

(87) PCT Pub. No.: WO2013/001215
PCT Pub. Date: Jan. 3, 2013

(65) Prior Publication Data
US 2014/0294554 A1    Oct. 2, 2014

(30) Foreign Application Priority Data

Jun. 27, 2011 (FR) ...................................... 11 55671

(51) Int. Cl.
*B65D 71/38* (2006.01)
*B65G 57/02* (2006.01)
(Continued)

(52) U.S. Cl.
CPC ................. *B65B 5/024* (2013.01); *B65B 5/10* (2013.01); *B65B 7/28* (2013.01); *B65D 5/0015* (2013.01);
(Continued)

(58) Field of Classification Search
CPC .. B65D 5/0015; B65D 5/48022; B65D 5/28; B65D 5/32; B65D 2570/00265; B65D 2571/00339; B65D 2571/0045; B65D 2571/00666; B65D 21/0219; B65D 21/0222; B65D 21/0223; B65D 2570/00339; B65D 71/26; B65B 5/024; B65B 7/28; B65G 57/02
USPC ............... 206/503, 509; 229/120.17, 120.24, 229/120.16, 915
See application file for complete search history.

(56) References Cited

U.S. PATENT DOCUMENTS 2,046,485 A    9/1932 Ringler
2,690,285 A *  9/1954 Main .................... B65D 5/2038
                                                  206/509

(Continued)

FOREIGN PATENT DOCUMENTS

BE    693 149 A       7/1967
EP    1 657 164 A1    5/2006
(Continued)

OTHER PUBLICATIONS

International Search Report, dated Sep. 19, 2012, from corresponding PCT application.

*Primary Examiner* — Chun Cheung
(74) *Attorney, Agent, or Firm* — Young & Thompson

(57) ABSTRACT

The packaging for at least one layer of at least two objects includes in combination an assembled blank produced from a flat blank and a cover which are secured rigidly together head-to-tail, the flat blank including at least one pair of two panels for receiving objects, two external edge panels, at least one pair of two internal spacer panels, at least one of the edge panels and the spacer panels including, on its top, supporting side, its top, supporting folding line, at least one projecting part, at least one of the receiving panels including, next to its bottom folding line, at least one penetrating part, the projecting and penetrating parts being dimensioned and positioned such as to be able, when the blank is assembled, to engage respectively with a penetrating part of another assembled blank located vertically above and with a projecting part of another assembled blank located vertically beneath.

38 Claims, 5 Drawing Sheets

Figure 1:
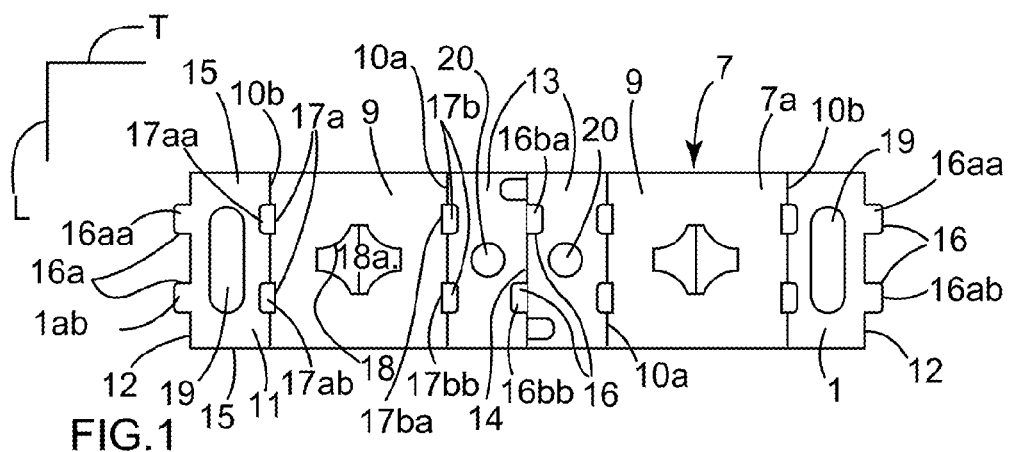

(51) Int. Cl.
*B65B 5/02* (2006.01)
*B65D 5/32* (2006.01)
*B65B 5/10* (2006.01)
*B65B 7/28* (2006.01)
*B65D 5/00* (2006.01)
*B65D 5/4805* (2006.01)

(52) U.S. Cl.
CPC ............ *B65D 5/32* (2013.01); *B65D 5/322* (2013.01); *B65D 5/48022* (2013.01); *B65D 71/38* (2013.01); *B65G 57/02* (2013.01); *B65D 2571/0045* (2013.01); *B65D 2571/0079* (2013.01); *B65D 2571/00265* (2013.01); *B65D 2571/00339* (2013.01); *B65D 2571/00666* (2013.01); *B65D 2571/00716* (2013.01); *B65D 2571/00895* (2013.01)

(56) References Cited

U.S. PATENT DOCUMENTS

| | | |
|---|---|---|
| 2,718,997 A | 9/1955 | Shuxteau |
| 2,744,675 A | 5/1956 | Crane |
| 2,777,627 A | 1/1957 | Crane |
| 2,850,223 A | 9/1958 | Strauss |
| 2,868,430 A | 1/1959 | Hamilton |
| 2,903,176 A | 9/1959 | Crane |
| 3,017,064 A | 1/1962 | Davis |
| 3,036,753 A | 5/1962 | Davis et al. |
| 3,040,955 A | 6/1962 | Paul |
| 3,055,572 A | 9/1962 | Crane |
| 3,100,595 A | 8/1963 | Curtiss et al. |
| 3,127,086 A | 3/1964 | Crane |
| 3,194,472 A | 7/1965 | Crane |
| 3,385,430 A | 5/1968 | Benzon-Petersen |
| 4,018,377 A | 4/1977 | Kent et al. |
| 4,335,843 A | 6/1982 | Kent |
| 4,347,969 A | 9/1982 | Kost et al. |
| 4,369,913 A | 1/1983 | Muise |
| 4,371,366 A | 2/1983 | Bower et al. |
| 4,436,243 A * | 3/1984 | Nason ............... B65D 5/38 229/120.17 |
| 4,848,648 A | 7/1989 | Eisman |
| 4,944,451 A | 7/1990 | Forbes, Jr. |
| 5,009,363 A | 4/1991 | Zavatone |
| 5,265,796 A | 11/1993 | Gulliver et al. |
| 5,415,342 A * | 5/1995 | Harrelson ......... B65D 5/50 229/120.38 |
| 5,458,283 A * | 10/1995 | Southwell ......... B65D 5/4295 229/178 |
| 5,839,650 A * | 11/1998 | Sheffer ............ B65D 5/001 229/117.16 |
| 7,124,890 B2 * | 10/2006 | McLeod ........... B65D 5/0015 206/509 |
| 2001/0042783 A1 * | 11/2001 | Jackson .......... B65D 5/0045 229/174 |
| 2004/0129594 A1 | 7/2004 | Andersen et al. |
| 2010/0072148 A1 | 3/2010 | Ferry |

FOREIGN PATENT DOCUMENTS

| | | |
|---|---|---|
| FR | 2 888 821 A1 | 1/2007 |
| FR | 2 911 851 A | 8/2008 |
| GB | 405995 A | 2/1934 |
| GB | 2040884 A | 9/1980 |
| JP | 2007045449 A | 2/2007 |
| WO | 96/17791 A1 | 6/1996 |
| WO | 97/28051 A1 | 8/1997 |
| WO | 97/30908 A1 | 8/1997 |
| WO | 2006/091533 A1 | 8/2006 |
| WO | 2008/095194 A1 | 8/2008 |

* cited by examiner

PACKAGING OF OBJECTS LOCATED IN ONE OR MORE LAYERS

BACKGROUND OF THE INVENTION

1. Field Of The Invention

The invention relates to the packaging of objects arranged in one or more layers. More specifically, the invention has as its object, firstly, a flat blank, especially capable of, once expanded, being part of a package for at least one layer of at least two objects. It also has as its object, secondly, such an expanded blank. It also has as its object, thirdly, such a package for at least one layer of at least two objects comprising, in combination, such an expanded blank and a cap. It also has as its object, fourthly, a bundle comprising such a package and at least one layer of at least two objects. It also has as its object, fifthly, a palletized load of objects or a group of objects arranged in at least one layer, comprising such bundles. It also has as its object, sixthly, a process for the creation of such a bundle. It also has as its object, seventhly, a process for the production of such a palletized load. It also has as its object, eighthly, an installation for the implementation of said process for the production of such a bundle.

2. Description Of The Related Art

Within the context of the invention, in a typical embodiment, "object" conventionally refers to a primary package comprising one or more jars or another container, filled with a dairy product or dessert, arranged in one or more longitudinal and/or transverse rows. Typically, such a jar is made of plastic material and comprises a side wall of a general cylindrical or prismatic or truncated or truncated pyramid shape, a bottom wall and a top wall, in particular a lid or another similar arrangement. In a typical manner, multiple jars are connected to one another, in particular by a connecting collar or another similar arrangement. In some embodiments, the object also comprises a cardboard jacket or another similar arrangement surrounding the jars. It is understood that the case where the object comprises one or more jars as they have been defined is not limiting, with another container able to be provided instead of the jar in question. Within the context of the invention, "object" is defined as an object as was just described or any similar object.

The jars in question most often come not as a unit but in a group of multiple jars, multiple jars being connected to one another by a connecting collar or another similar arrangement as indicated, and/or superposed on multiple layers. In contrast, the groups of jars are designed to be placed on a pallet with resulting vertical compression forces.

According to a known and current embodiment, each group of jars comprises an envelope, and multiple groups of jars are arranged side by side on a transport tray made by expanding a flat blank. This transport tray comprises, firstly, a lower and horizontal rectangular bottom and, secondly, four walls with edges extending above the bottom on its four sides, whose free edges opposite the bottom are shaped in such a way as to present four higher angular parts and whose angles with the bottom are shaped so as to have four angular cut-outs. Each group of jars is arranged on the upper surface of the bottom. When a transport tray is filled with groups of jars, its free upper surface is formed by the free surface of the top walls of the jars unless a cap that forms a cover is provided. When two transport tray filled with groups of jars are superposed, the four higher angular parts of the lower transport tray engage with the four angular cut-outs of the upper transport tray. To ensure the resistance to the vertical compression forces, the transport tray is stiffened in different possible manners: creation of parts shaped in relief, creation of multiple layers made mutually integral.

Such an embodiment has several constraints and restrictions. If it is desired that the jars have a limited thickness, it is necessary to have to reinforce the transport tray with the inherent drawbacks. If the transport trays are necessary for transport, their added value at the point of sale or for the buyer is non-existent. If a cap forming a cover is provided, the amount of material that is used is significant. With such an embodiment, the retail store has to be concerned with eliminating the transport trays as the latter are emptied of jars.

According to the embodiment described by the document FR-A-2911851, a group of jars is removed from an envelope, and multiple groups of jars are arranged side by side on a presentation tray created by expanding a flat blank. This presentation tray comprises, firstly, a lower and horizontal rectangular bottom. The presentation tray comprises, secondly, three edge walls extending above the bottom on three of its sides, whose free edges opposite to the bottom are shaped in such a way as to exhibit two higher angular parts, and whose angles with the bottom are shaped in such a way as to exhibit two angular cut-outs. The presentation tray comprises, thirdly, one or more separation walls extending above the bottom and located apart from its edges, each made by edge-to-edge folding and at 90° from two flat blank regions. The height of the separation walls is smaller than the height of the edge walls. Each group of jars is arranged astride the free edge of a separation wall. According to the document FR-A-2911851, the compression force exerted on the jars as a result of the stacking on a pallet is decreased, and it is thus possible to reduce the thickness of the wall of the jars between approximately 0.7 mm and 0.8 mm. When a presentation tray is filled with groups of jars, its free upper surface is formed by the free surface of the top walls of the jars. When two presentation trays filled with groups of jars are superposed, as in a pallet, the lower surface of the bottom of the upper tray rests on the free surface of the top walls of the jars, and the two higher angular parts of the lower tray engage with the two angular cut-outs of the upper tray. The tray constitutes a presentation tray of the jars on the selling site, with the buying client picking up a group of jars by extracting it from the tray and more especially from the separation wall on which it is arranged astride.

Such an embodiment has several constraints and restrictions. This embodiment rules out placing the groups of jars in envelopes, the latter preventing each group of jars from being arranged astride the free edge of a separation wall. However, such envelopes most often prove very useful for informational purposes, for example. Next, if it makes it possible to reduce the compression force exerted on the jars, this embodiment does not eliminate it by any means, with an upper tray filled with jars resting on the free surface of the top walls of the jars filling the lower tray. Consequently, the thickness of the jars cannot be excessively limited, unless the jars are crushed or the risk of crushing of the jars is greatly increased. With this embodiment, it is necessary that the jars have a flat top wall, which rules out other fancy shapes. With this embodiment, the groups of jars are limited to a small number of jars, four as shown in the document, which rules out, for example, jars grouped in multiple layers. With this embodiment, the relative maintenance of two superposed trays can pose a problem, with the number of upper higher angular parts and lower angular cut-outs necessarily being limited to two. With such an embodiment, the retail store has to be concerned with eliminating the presentation trays as the latter are emptied of jars.

According to the embodiment that is described by the documents WO 96/17791, US 2004/0129594, WO 2006/091533, the jars of a group of jars are attached by their bottom walls to a thin container that is created by expanding a flat blank. This container comprises, firstly, a lower and horizontal rectangular bottom and, secondly, four edge walls slightly extending above the bottom on its four sides.

Each group of jars is arranged on the upper surface of the bottom. Several containers that are thus filled with jars are arranged side by side. A cut-out is placed on the free upper surface formed by the top walls of the jars of the groups placed on the bottom of these containers. A film made of thermoretractable plastic material closes the unit. When two such units are superposed, as in a pallet, the lower outside surface of the film of the upper unit rests on the upper outside surface of the film of the lower unit.

Such an embodiment has several constraints and restrictions. The jars directly absorb the compression forces, which rules out having jars of a limited thickness. The container, the cut-out and the film have an added value at the point of sale or for the buyer, which is non-existent. The relative holding of several containers side by side is very limited. The superposed units can be moved in a relative manner in relation to one another. The amount of material that is used is significant. The retail store has to be concerned with opening the units and eliminating the containers, the cut-outs, and the film during use.

The document U.S. Pat. No. 2,046,485 describes a package formed from a flat blank comprising a bottom part with an inside separation for forming two compartments and a cover part connected to the bottom part by a fold line. Both the bottom part and the cover part have horizontal and rectangular main panels, respectively a lower bottom panel and an upper cover panel, and four edge walls that extend slightly above this panel.

The document U.S. Pat. No. 5,265,796 describes a package for a food product in the form of a blank that is expanded from a flat blank and comprising two panels for receiving objects arranged side by side on a first surface, four outside edge panels on the four sides, and two inside spacer panels, placed one against the other by their second surfaces and arranged in the median perpendicular to the two receiving panels and parallel to a pair of edge panels. A cap is arranged head to foot and secured to the expanded blank, above.

These last two embodiments proceed from a container-type design with a cover with four edge panels. These embodiments are unsuitable for the case of jars as contemplated by the invention. The packages have an added value at the point of sale or for the buyer, which is non-existent. The superposed packages can move in a relative manner in relation to one another. The amount of material that is used is significant. The retail store has to be concerned with opening the units and eliminating the packages.

The document WO 97/30908 relates to a grouping element that is intended to group at least two packages, each containing at least one block of jars connected by a collar or individual jars, said packages being arranged side by side in a single row in such a way that their respective open surfaces are turned to the same side, characterized in that it comprises a bottom wall made of cardboard on which the packages rest and two side flaps made of cardboard, each equipped at its ends with at least two tenons that can be folded at 90° relative to the side flaps and can be interlocked respectively in the two passages that are defined between the jars that are located in the two packages farthest from said row of packages, in such a way as to be wedged under the collars of said jars or under the wall of said packages.

The object of the document EP 1 657 164 is a bundle that has a body part and side parts attached to the body part. The body part is manufactured from a blank having fold lines, and the side parts delimit three sections.

The object of the document WO 97/28051 is a cardboard box with several levels for groups of items, formed from upper and lower preforms of a foldable sheet material in which the blank comprises foldable feet for improving the stacking. The cardboard also comprises additional vertical positioning feet for positioning openings.

The document BE 693149 describes a package consisting of a foldable cardboard sheet, and an envelope sheet of paper, plastic, or the like, with the whole being arranged in two parallel rows.

The document FR 2888 821 describes a package made of a semi-rigid material, such as cardboard or corrugated cardboard, comprising a body containing a lot of objects, in particular objects with an axis of symmetry, designed to be shipped and displayed for sale in this body, the package body comprising a rectangular bottom, on which the objects rest, and at least two side walls, articulated by a scoring along two parallel sides of the bottom and raised perpendicular to this bottom, at least one of the other two sides of the bottom lacking a wall, this package being characterized in that along the side or sides lacking a side wall, at least one flexible link including the two ends are attached respectively to the two contiguous parallel walls of the package, and which is essentially parallel to the bottom of the package, encircles the packaged objects by exerting on them a traction toward the inside of the package in such a way as to keep these objects in position during shipping, where this link can be broken when these objects are displayed for sale so that the potential buyers can have easy access to these objects.

SUMMARY OF THE INVENTION

The problem on which the invention is based is therefore to produce a package system for one—and possibly multiple—layers of objects, according to the definition prior to this term, which made it possible both to have jars of smaller thickness, therefore a priori less—or not very—resistant to compression, with the direct or indirect inherent advantages in terms of cost, and to have a lower consumption of other package material, such as cardboard, with, nevertheless, at the same time, an excellent resistance to compression. Another problem is to eliminate the superfluous packages. Another problem is to make it possible that each group of jars be encased by an envelope at least if this is desired. Another problem is to facilitate the display of jars. Another problem is to minimize the management of packages on the points of sale. Another problem is to do this in such a way that the package is as versatile as possible: for the grouping, the shipping, the sales display, and the use by the buyer. Another problem is to do this in such a way that the different stacked package layers, such as on a pallet, cannot move relative to one another. Another problem is to preserve and even to enhance the ventilation of the jars. Another problem is to provide convenience and visibility. Another problem is to be able to complete such a package system of one or more carrying handles, absent from the packages described above. Another problem is that the creation of such a package can be done in a fast, simple, reliable and economical manner.

For this purpose, according to a first aspect, the invention has as its object a flat blank, especially capable of, once expanded and combined and secured to a cap, forming a package for at least one layer of at least two objects, with the flat blank being of the cardboard type or the like with a number of strong panels, a number of fold lines parallel to a longitudinal direction connecting adjacent panels, a first surface and a second surface, including:

At least one pair of two panels for receiving objects, each delimited transversely by two bottom fold lines, able to be arranged in the expanded blank in an at least essentially coplanar manner and side by side transversely, in such a way that the objects can rest on their first surfaces, Two similar outside edge panels, similar to one another, arranged laterally, each delimited transversely by a bottom fold line and a top supporting edge, each connected to a receiving panel by a bottom fold line that can be arranged, in the expanded blank, in an at least essentially parallel manner to one another and orthogonal to the receiving panels, At least one pair of two internal spacer panels, similar to one another, arranged in the median, each delimited transversely by a bottom fold line and a top supporting fold line, connected to one another by said top supporting fold line and connected to two receiving panels by two bottom fold lines, and that can be arranged in the expanded blank against one another by their second surfaces and in a manner that is at least essentially parallel to the edge panels, with the edge panels and the spacer panels having the same orientation relative to the receiving panels and having between their bottom fold line and either their top supporting edge or their top supporting fold line, a similar transverse width.

Such a blank is such that:

At least one of the edge panels and spacer panels comprises, over its top supporting edge, its top supporting fold line, at least one projecting part extending essentially in the plane of said edge panel, said spacer panel, in the essentially orthogonal direction and in the direction opposite to the bottom fold line of said edge panel, of said spacer panel, At least one of the receiving panels comprises, adjacent to its bottom fold line with an edge panel, a spacer panel, at least one through part for an insertion essentially into the plane of said edge panel, of said spacer panel, and in the direction that is essentially orthogonal to said receiving panel, The projecting part and the through part, respectively, are of sizes and are positioned in a manner relative to the top supporting edge, the top supporting fold line, and the bottom line, in such a way as to be able, with said blank being expanded, to engage respectively with a through part of another similar expanded blank arranged vertically above and with a projecting part of another similar expanded blank arranged vertically below.

According to an embodiment, the frontal envelope of a projecting part is below the frontal contour of a through part in such a way as to ensure their engagement; in particular, said envelope and said contour are adjusted to ensure their engagement without substantial play.

According to an embodiment, a through part extends in part over a receiving panel and in part over the edge panel or over the spacer panel adjacent to said receiving panel, astride the bottom fold line between the receiving panel and said edge panel or said spacer panel.

According to an embodiment, a through part, a projecting part, has an elevation in the general shape of a polygon or is integrated into an envelope in the general shape of a polygon, in particular a general shape of a rectangle or square; in particular, a through part and a projecting part have a similar shape in elevation.

According to an embodiment, at least one of the edge panels and at least one of the spacer panels comprise at least one projecting part and at least one through part.

According to an embodiment, the two edge panels and/or the two spacer panels comprise at least one projecting part and at least one through part.

According to an embodiment, a projecting part or a through part is in multiple similar sections, coplanar to one another, spaced along the longitudinal direction, in particular is in two sections; and in particular the projecting part(s) and the through part(s) of the blank all have the same number of sections. In particular, the sections of a projecting part, or a through part, are spaced and essentially distributed equally along the top supporting edge, the top supporting fold line, or the bottom fold line, where they are located.

According to an embodiment, a projecting part extends from the top supporting edge or from the top supporting fold line where it is located and in the essentially orthogonal direction and in the direction opposite to the bottom fold line of the edge panel or the spacer panel that comprises it, over a length that is a small fraction of the transverse width of the edge panels and the spacer panels, in particular a fraction of between 5% and 30%, more especially between 10% and 20%.

According to an embodiment, a projecting part and/or a through part, in one or more sections, extends overall along the top supporting edge, the top supporting fold line, and the bottom fold line where it is located, over a length that is a fraction of the length of said top supporting edge, said top supporting fold line, said bottom fold line, in particular a fraction of between 15% and 35%, more especially between 18% and 28%.

According to an embodiment, the projecting part of the first spacer panel of a pair of spacer panels is delimited and formed by a scalloping of the second spacer panel of the pair of spacer panels, with the top supporting fold line between the first spacer panel and the second spacer panel being interrupted in said projecting part.

According to an embodiment, over their two edges arranged essentially parallel to the transverse direction, the receiving panels are removed from the edge panels.

According to an embodiment, at least one—and in particular all—of the receiving panels comprise(s) one or more cut-out segments delimiting one or more flaps, able, with the blank being expanded, to be set up relative to the receiving panels in the same direction as the edge panels and the spacer panels for the purpose of maintaining the objects.

According to an embodiment, at least one—and in particular the two—edge panel(s) comprise(s) at least one opening that is capable of, with the blank being expanded, aeration and/or gripping.

According to an embodiment, at least one—and in particular the two—spacer panel(s) of at least one pair of spacer panels comprise(s) at least one opening that is capable of—with the blank being expanded—aeration.

According to a second aspect, the invention has as its object an expanded blank, especially capable of being part of a package, being combined and secured to a cap, created by the expanding of a flat blank as it was just described, in which:

The two receiving panels of the at least one pair of receiving panels are arranged in an at least essentially coplanar manner and side by side transversely, in particular are arranged at least essentially horizontally, in such a way that the objects can rest on their first surfaces, The two edge panels are arranged in an at least essentially orthogonal manner to the receiving panels, in particular are arranged at least essentially vertically, The two spacer panels of the at least one pair of spacer panels are arranged against one another by their second surfaces and in a manner that is at least essentially orthogonal to the receiving panels and in the same direction as the two edge panels, in particular are arranged at least essentially vertically, The projecting part extends essentially in the plane of the edge panel, the spacer panel, comprising it, in the essentially orthogonal direction and in the direction opposite to the bottom fold line of said edge panel, said spacer panel, in particular is located in the upper part of the expanded blank and is directed upward, with the through part being located in the lower part of the expanded blank.

According to a third aspect, the invention has as its object a package for at least one layer of at least two objects comprising in combination a expanded blank as was just described and a cap, rigidly secured to one another, head to foot, and in which:

The receiving panels form an inside and lower support surface for receiving objects, the edge panels form a lateral edge of the objects toward the outside, and the spacer panels form a lateral edge of the objects toward the inside, The cap comprises an upper cover part, located vertically above the at least one pair of receiving panels, and said cover part engages with, in particular rests on, the top supporting edges and the top supporting fold line(s) of the edge panels and the spacer panels, The receiving panels and the cap delimit between them an object packaging space, and said object packaging space comprises at least two compartments that are transversely side by side, separated from one another by at least one pair of spacer panels arranged against one another, the at least two compartments being capable of receiving the at least two objects, The cap comprises an engagement part secured to the expanded blank, in particular secured to the edge panels, The cap houses one or more cap passages for the passage of the projecting part(s) of the expanded blank, which projecting part(s) of the expanded blank project above the cover part of the cap.

According to a first variant embodiment of the package, the cap is formed by an expanded blank, of the cardboard type or the like, with a cover panel and two lateral engagement folds, similar to one another located, on both sides of the cover panel and connected to the latter by two cap fold lines, with the two folds coming against and being secured to the two edge panels of the expanded blank, the cover panel comprising at least one cap passage in the form of a through part of the localized cap adjacent to the cap fold line of the cover panel with at least one fold and/or localized facing a pair of spacer panels of the expanded blank, with the cap through part and a projecting part of the expanded blank being respectively of sizes and being positioned in a relative manner such that a projecting part of the expanded blank passes through a cap through part and projects from the outside surface of the cover panel of the cap.

According to an embodiment, the cover panel of the cap comprises at least one cap through part adjacent to said cap fold line, in particular to two cap fold lines, and at least one cap through part facing a pair of spacer panels, in particular each pair of spacer panels.

According to an embodiment, the frontal envelope of a projecting part of the expanded blank is less than the frontal contour of a cap through part, in such a way as to ensure their engagement; in particular, said envelope and said contour are adjusted to ensure their engagement without substantial play.

According to an embodiment, the cap comprises cap through parts that are equal in number and with an arrangement that is similar to the projecting parts of the expanded blank.

According to an embodiment, a cap through part extends in part over the cover panel of the cap and in part over a fold panel of the cap, astride their corresponding cap fold line.

According to an embodiment, a cap through part is in multiple spaced similar sections, engaging with a projecting part of the expanded blank in multiple sections.

According to an embodiment, the cover panel of the cap comprises one or more cut-out segments delimiting one or more parts that are capable of being set up above the cover panel for the purpose of forming a gripping means.

According to an embodiment, at least one—and in particular the two—cap fold panel(s) comprise(s) at least one opening that can be aligned with an aeration opening and/or a gripping opening of the expanded blank.

According to an embodiment, the expanded blank and the cap are made integral by gluing, welding, stapling or the like.

According to an embodiment, the cap does not project from the expanded blank from one side or the other in the longitudinal direction.

According to a second implementation variant of the package, the cap is formed by a stretched belt or link segment comprising at least one cover part and two folds, or by a sheath segment or a segment with a link closed on itself, comprising at least one cover part, a lower part, and two folds, with the segment of belt or link or sheath or link closed on itself being secured to the expanded blank by gluing, welding, stapling, clamping, or the like.

According to a fourth aspect, the invention has as its object a bundle comprising a package as was just described and at least one layer of at least two objects, with the lower layer of objects resting by its lower surface on an inside and lower support surface formed by the inside and upper surface of the receiving panels, with the edge panels forming a lateral edge of objects toward the outside, and the spacer panels forming a lateral edge of the objects toward the inside, with the at least two objects being located in the at least two compartments side by side transversely with the object packaging space, separated by a pair of spacer panels arranged one against the other between objects, with the space requirement of the at least one layer of objects in the direction orthogonal to the receiving panels and to the cover part of the cap, between the lowermost surface and the uppermost surface, being similar to or at most equal to the spacing between the inside and upper surface of the receiving panels and the inside and lower surface of the cover part, in such a way that the inside and lower surface of the cover part comes against or is in the vicinity of the upper surface of the upper object layer, with the projecting part(s) of the expanded blank projecting above the cover part of the cap.

According to an embodiment, the bundle comprises either one or multiple layers of objects, with these layers then being superposed, in particular directly superposed.

According to an embodiment, an object is a primary package filled with contents, comprising one or more jars arranged in multiple longitudinal and/or transverse rows, a jar having a side wall in the general shape of a cylinder or prism, a bottom wall and a top wall, in particular a lid, with several jars being connected to one another, in particular toward their top walls. In addition, according to a particular embodiment, an object comprises a peripheral collar, in particular a collar for connection of several jars, the edge of the collar coming against the edge panel and/or the spacer panel. And, according to another particular embodiment, an object is a primary package comprising one or more jars arranged in multiple longitudinal and/or transverse rows with a cardboard jacket or the like surrounding the jars.

According to an embodiment and a characteristic, an object is a primary package comprising one or more jars with a thickness less than the current common thickness of such jars and in particular with a thickness of less than approximately 0.7 mm, 0.8 mm.

According to a fifth aspect, the invention has as its object a palletized load of objects comprising a pallet on which rests a number of bundles as were just described arranged beside one another and stacked on one another vertically, with the outside and lower surface of the receiving panels of an upper bundle resting on the outside and upper surface of a cover part of a lower bundle, with the projecting parts directed toward the top of a lower bundle engaging with the through parts of an upper bundle, without the necessity for additional package means of each bundle or multiple bundles arranged side by side.

According to a sixth aspect, the invention has as its object a process for the production of a bundle as was described above. According to this process:

At least two objects are available,
A flat blank as was described above is available,
A cap is available,
The blank is shaped,
The objects are arranged in such a way as to form at least one layer of at least two objects, with the lower layer of objects resting on the inside and upper surface of the receiving panels, and any other layer of objects being superposed on the lower layer,
The cap is placed on the expanded blank head to foot, with the cover part being placed vertically above the receiving panels, the inside and lower surface of the cover part coming against or in the vicinity of the upper surface of the upper layer of objects, with the cover part engaging with the top supporting edges and the top supporting fold line(s) of the edge panels and the spacer panels, with the projecting part(s) of the expanded blank projecting above the cover part of the cap,
And the cap is secured to the expanded blank.

According to a seventh aspect, the invention has as its object a process for the production of such a palletized load, in which:

A pallet is available,
Bundles as were described above are available,
And the bundles are placed on the pallet, beside one another, and stacked on one another vertically, without the necessity for additional package means of each bundle or multiple bundles arranged side by side.

Finally, according to an eighth aspect, the invention has as its object an installation for implementing the process for the production of a bundle that was just described. Such an installation comprises:

Means for supplying at least two objects, flat blanks, and caps,
Means for shaping blanks,
Means for arranging objects on the blanks,
Means for arranging a cap on the expanded blank head to foot,
Means for securing the cap to the expanded blank.

BRIEF DESCRIPTION OF THE DRAWING FIGURES

Figure 2:
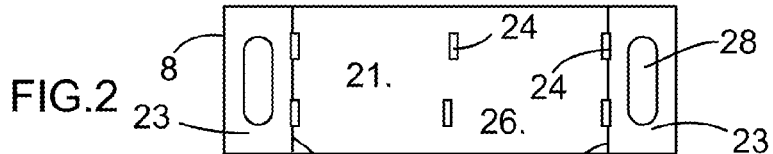
Figure 3:
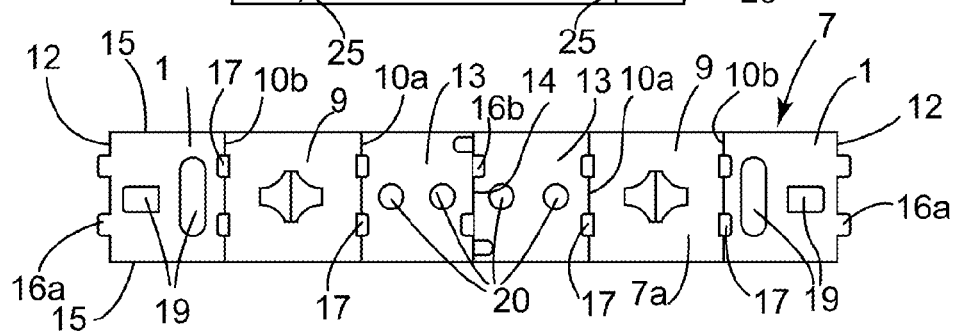
Figure 4:
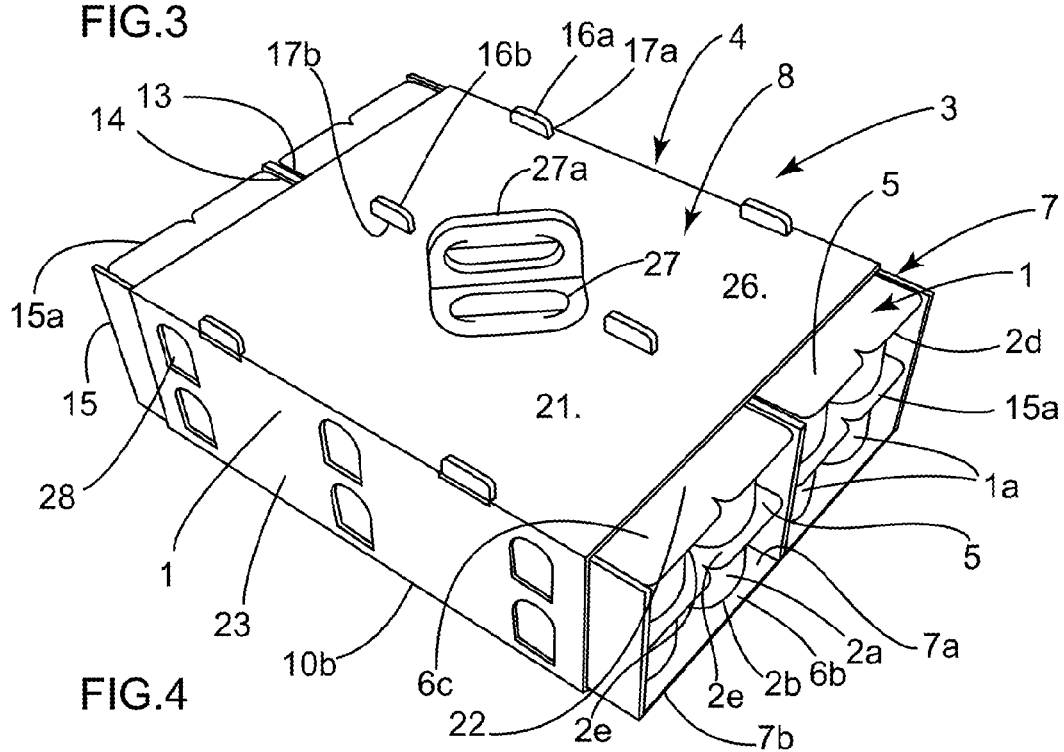
Figure 5:
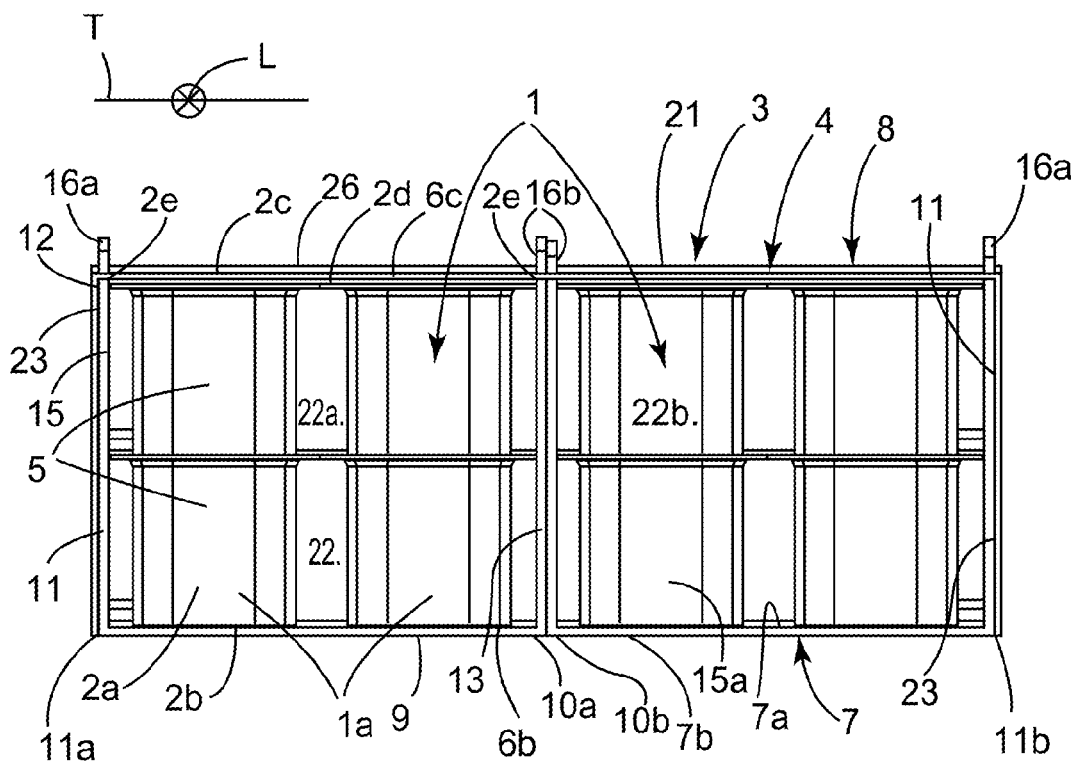
Figure 6:
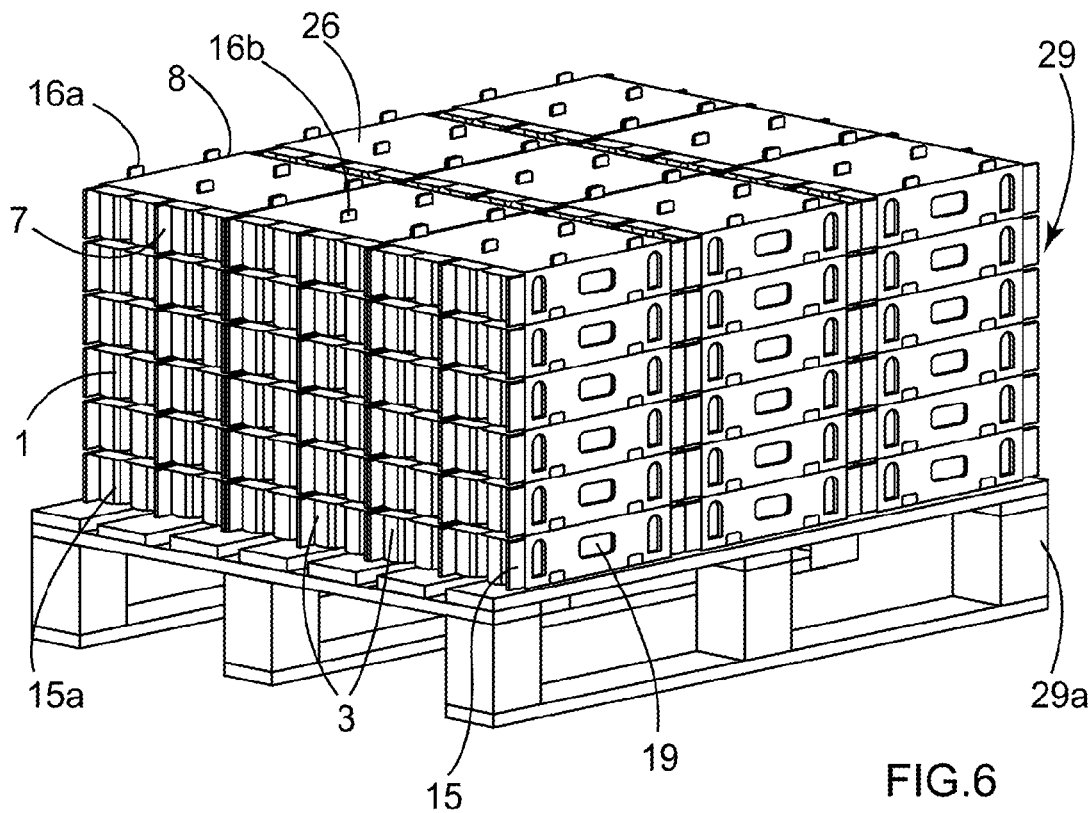
Figure 7:
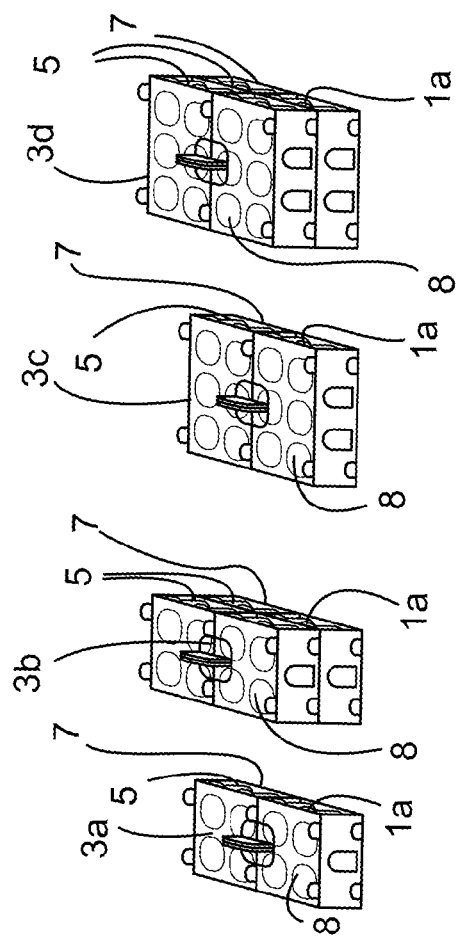
Figure 7:
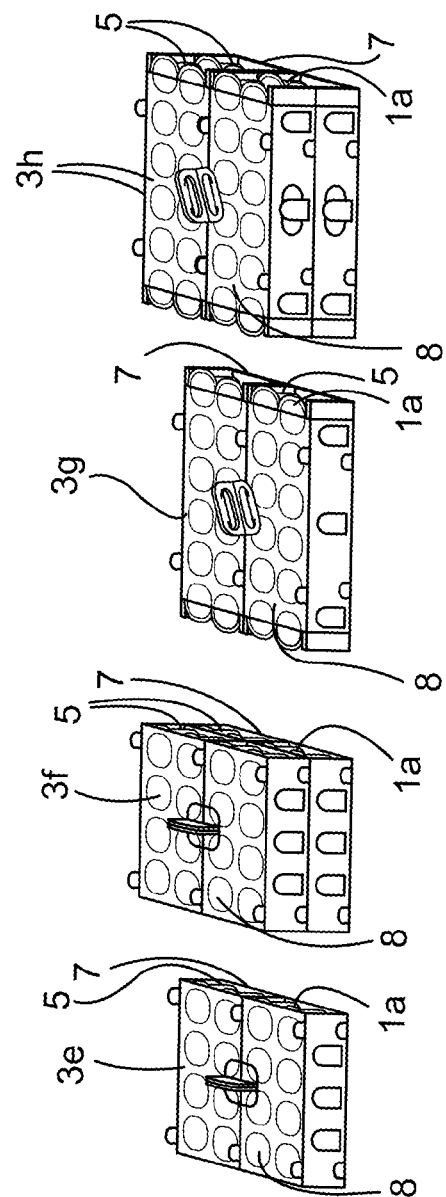
Figure 8:
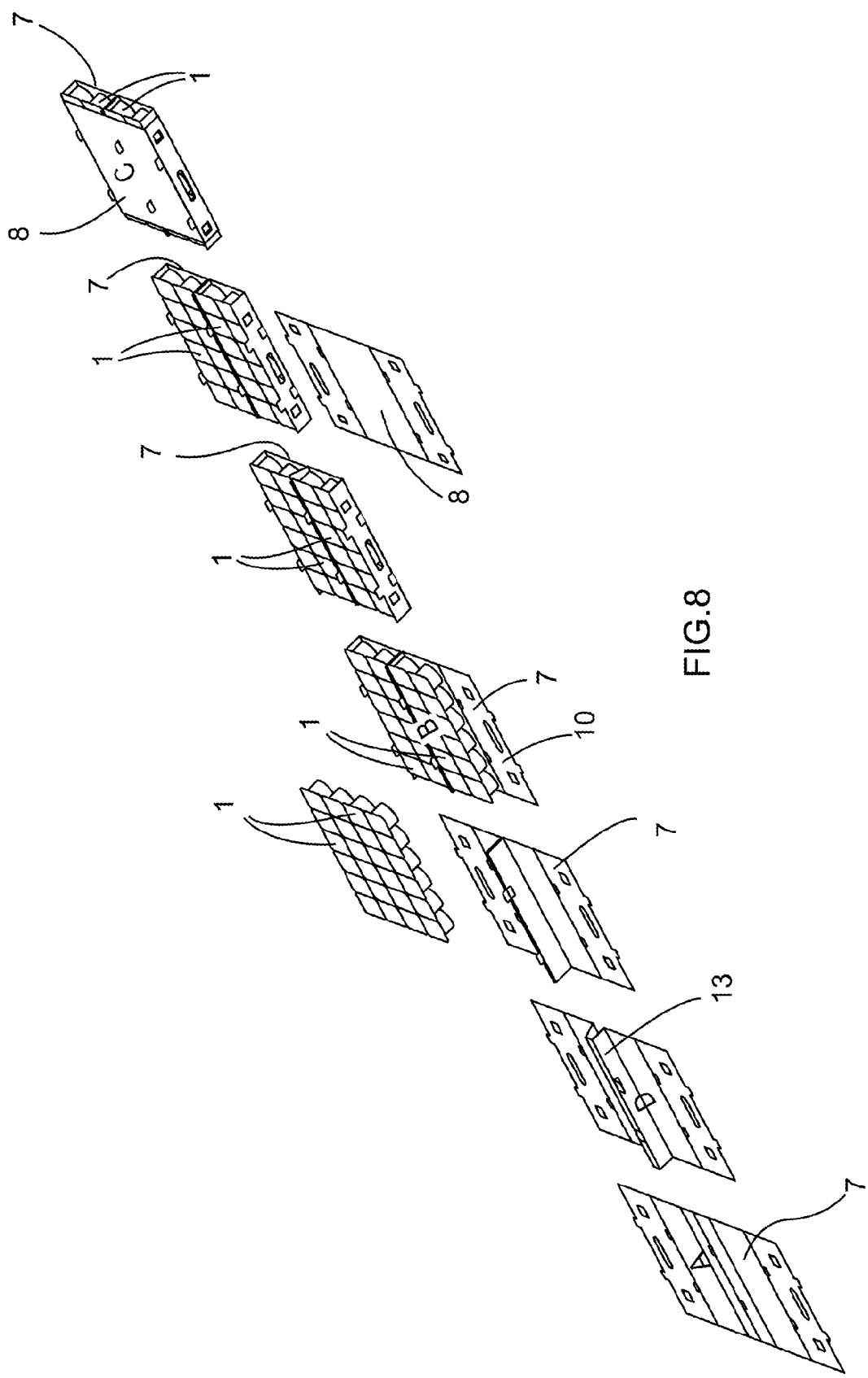
Figure 9:
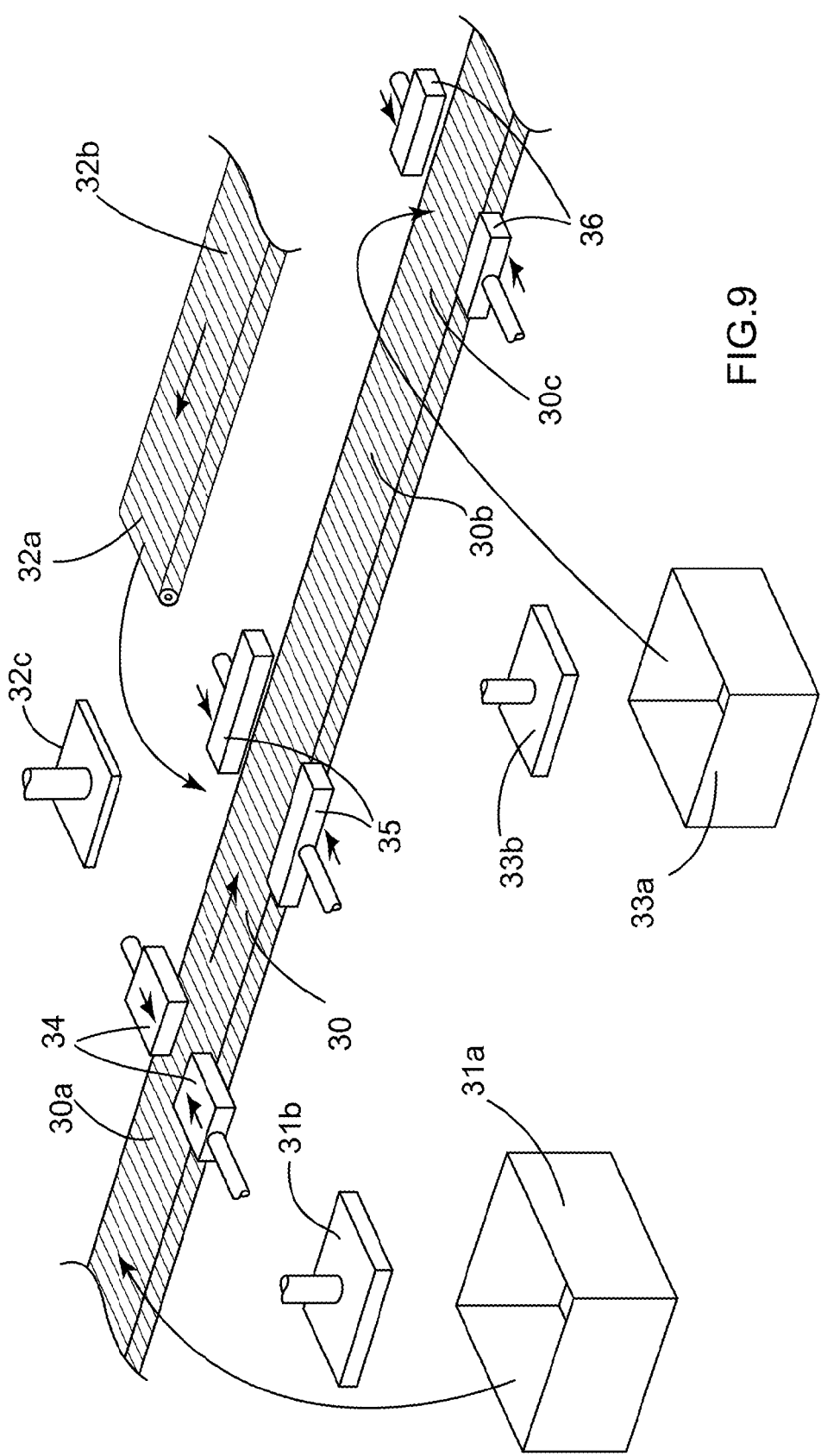

Several embodiments of the invention are now described using drawings, in which:

FIG. 1 is a front view of a flat blank entering the embodiment of a package according to the invention, in a possible non-limiting embodiment, for a single layer comprising two objects, each consisting of four jars over two longitudinal rows and two transverse rows, or eight jars in all, FIG. 2 is a front view of a flat cap entering the embodiment of the package comprising a blank such as the expanded blank of FIG. 1, FIG. 3 is a view similar to FIG. 1 of a flat blank for a package with two layers each comprising two objects, each consisting of four jars over two longitudinal rows and two transverse rows, or 16 jars in all, FIG. 4 is a perspective view, and FIG. 5 is a front view of a bundle according to the invention in a possible non-limiting embodiment, comprising two layers, FIG. 6 is a perspective view of a palletized load comprising a pallet on which rest a number of bundles according to the invention that are arranged beside one another and stacked on one another in multiple layers, FIG. 7 is a diagrammatic perspective view of eight variants of bundles according to the invention, in eight different non-limiting configurations, FIG. 8 is a perspective diagram illustrating an embodiment of the process according to the invention, FIG. 9 is a perspective diagram illustrating in a simplified manner an embodiment of an installation according to the invention for the implementation of the process that is illustrated by FIG. 8.

DETAILED DESCRIPTION OF THE INVENTION

An object 1 within the context of the invention is a primary package filled with its contents that comprises one or more jars 1a or the like, arranged in one or more longitudinal and/or transverse rows. Such a jar 1a is of the type having a side wall 2a in the general shape of a cylinder or prism, a bottom wall 2b, and a top wall 2c such as a lid. Of course, such an embodiment is provided only by way of example, with the shape of a jar 1a being able to be the object of other embodiments. Several jars 1a constituting an object 1 are connected to one another in such a way as to form a unit, typically toward their coplanar top walls 2c, by means of a connecting collar 2d having a peripheral annular edge 2e. Although, according to the invention, it is not necessary to have it, an object 1 can also comprise a cardboard jacket or the like surrounding the jars 1a or the like. For example, an object 1 can comprise four jars 1a in two longitudinal rows and two transverse rows, or six jars 1a in two longitudinal rows and three transverse rows, or eight jars 1a in two longitudinal rows and four transverse rows, or twelve jars 1a in two longitudinal rows and six transverse rows. These embodiments are by way of indication and are non-limiting.

Such a jar 1a or the like is typically intended for a single use and with contents such as a dairy product or dessert, but with these intentions not being limiting.

Such a jar 1a or the like has a shaft that, typically and normally, is arranged vertically or essentially vertically or optionally slightly inclined with respect to the vertical line. It is in relation to this relative position of the jar 1a or the like that the description is conventionally given and in which should be included the terms "lower," "upper," "high," "low," "bottom," "top," "above," and "below" used for the description of the bundle 3, the package 4, and their constituent parts. This position of the jar 1a or the like is not, however, limiting, with a jar 1a or the like able to be found in other positions, such as the bundle 3 of which it is part and the package 4 that it comprises, and their constituent parts. Consequently, the terms "lower," "upper," "high," "low," "bottom," "top," "above," and "below" are no longer limiting relative to the bundle 3, the package 4, and their constituent parts.

"Longitudinal" and "transverse" are conventionally defined as two horizontal orthogonal directions, respectively L and T.

It is understood that within the context of the invention, the latter is not limited to the case of an object 1 that comprises one or more jars 1a as were just described, quite the contrary. In a more general manner, an object 1 comprises one or more primary packages filled with contents, which can be both jars 1a as were just described as well as other types of primary packages instead of the jars in question, with these primary packages responding to the same problem as the jars 1a. Consequently, the term "jar" is in no case limiting, and if the description is provided with reference to this particular example, the invention also applies to other primary packages than the jars 1a. In other words, "jar" is defined as a primary package.

The object of the invention is the packaging of at least one layer 5 of at least two objects 1, namely, typically, a single layer or two, three, and even a larger number of layers, with the number of layers 5 typically being less than, for example, four. The number of layers of objects 5 is not limiting, even if this number is limited.

"Layer of at least two objects" is defined as two or a larger number of similar objects 1 placed side by side, with their side walls 2a close to one another, their bottom coplanar walls 2b defining the lower surface 6b of the layer of objects 5, and their top coplanar walls 2c defining the upper surface 6c of the layer of objects 5.

When multiple layers of objects 5 are provided, the latter are superposed vertically. Thus, the upper layer of objects 5 rests by its lower surface 6b on the upper surface 6c of the lower layer of objects 5. According to an embodiment of the invention, the upper layer of objects 5 rests directly on the lower layer of objects 5, without the necessity for an insert. Whereas anything that can do more can do less, such an insert, although unnecessary, may be provided.

"Bundle" 3 is defined as the layer(s) of objects 5 and their package 4.

This package 4 comprises, in combination, an expanded blank 7 and a cap 8, rigidly secured to one another head to foot.

With reference most particularly to FIGS. 1, 3, 4 and 5, more especially the blank 7 is now described, which can be found either in the flat state, initially, or in the expanded state, finally, for the purpose of being, at some point, incorporated in the package 4. By "initially" and "finally," reference is made to the sequence of production of the package, as results from FIG. 9.

The blank 7 is of the cardboard type or the like with a number of strong panels and a number of fold lines that are parallel, and in particular here all parallel, to the longitudinal direction L, connecting the adjacent panels. A first surface 7a and a second surface 7b are defined on the blank 7.

Firstly, and in a general manner, the blank 7 comprises at least one pair of two panels for receiving objects 9, each limited transversely by two bottom fold lines, a lower, median bottom fold line 10a and a lower, lateral, bottom fold line 10b.

In the expanded blank 7, the two receiving panels 9 are arranged in a manner that is at least essentially coplanar and side by side transversely. The two receiving panels 9 are such that the objects 1 can rest on the first surface that, in the bundle 3, is the inside and upper surface forming an inside and lower support surface.

By "inside," the goal is to describe what is, or can be considered as being, inside the bundle 3 or the package 4. By "outside," conversely, the goal is to describe what is, or can be considered as being, outside of the bundle 3 or the package 4.

In the embodiments shown, the blank 7 comprises a single pair of two receiving panels 9, with these embodiments, however, not being limiting.

Secondly, the blank 7 comprises two outside edge panels 11.

By "outside," it is understood that the goal is to describe what is, or can be considered as being, toward the outside of the flat blank 7. Conversely, by "inside," the goal is to describe what is, or can be considered as being, toward the inside of the flat blank 7. By "median," the goal is to describe what is, or can be considered as being, in an inside central position.

The two edge panels 11 are similar and arranged laterally. Each edge panel 11 is delimited transversely by the lower bottom fold line 10b and a top (upper) supporting edge 12. Each edge panel 11 is connected to a receiving panel 9 by the bottom fold line 10b. In the expanded blank 7, the two edge panels 11 are arranged in a manner that is at least essentially parallel to one another and in an orthogonal manner to the receiving panels 9. In the embodiment shown, the top supporting edge 12 is a free edge.

In the embodiment shown, the blank 7 comprises only the two edge panels 11 mentioned above on two parallel sides of the blank 7 and not two pairs of edge panels on four sides of the blank 7, two by two parallel and two by two perpendicular. Actually, on their two edges arranged essentially parallel to the transverse direction, the receiving panels 9 are lacking edge panels. Thus, the blank 7 according to this embodiment differs from the blanks intended to form a container, which blanks per container comprise a bottom and two pairs of edge panels. And the expanded blank 7 differs from such a container. According to the invention, actually, it is not required to have two pairs of edge panels on the four sides of the blank for purposes of rigidity, the latter resulting from the very structure of the package 4. The fact that the blank 7 comprises only the two edge panels 11 has as a first advantage to not be required to provide for making two adjacent edge panels, perpendicular to one another, secured by means of feet and glue, or the like, as for a container comprising two pairs of edge panels. This advantage is the source of simplicity. A second advantage is that the expanded blank 7 and more generally the package 4 have a general jacket configuration that is attractive to the buyer, in particular making it possible to display the jars 1a or the like and making it possible to ensure their aeration by two openings 15a on both sides, limited by the edges 15.

Whereas anything that can do more can do less, such a second pair of edge panels, although unnecessary, may be provided.

Thirdly, the blank 7 comprises at least one pair of two internal spacer panels 13.

The two spacer panels 13 are similar and arranged in the median. Each spacer panel 13 is limited transversely by the bottom fold line 10a and a top (upper) supporting fold line 14. The two spacer panels 13 are connected to one another by said top supporting fold line 14. They are connected to two receiving panels 9 by two bottom fold lines 10a. In the expanded blank 7, the two spacer panels 13 are arranged against one another by their second surfaces and in such a way as to be at least essentially parallel to the edge panels 11, therefore in a manner that is at least essentially orthogonal to the receiving panels 9. In this situation, the two spacer panels 13 do not necessarily have to be positively secured directly against one another by their second surfaces, being kept in this relative position as a result of the presence of the cap 8. Whereas anything that can do more can do less, such an engagement, although unnecessary, may be provided.

The edge panels 11 and the spacer panels 13 have the same orientation relative to the receiving panels 9, following along in the transverse direction, with the fold lines 10a, 10b, 14 and the edges 12 being at least essentially parallel to one another in the longitudinal direction.

In contrast, the edge panels 11 and the spacer panels 13 have at least essentially the same dimension in the longitudinal direction (here conventionally called length) and in the transverse direction (here conventionally called width). This similar length is taken into account between two free edges 15, arranged at least essentially parallel to the transverse direction and delimiting the blank 7 on both sides. The free edges 15 are the free edges of receiving panels 9, edge panels 11, spacer panels 13, with the blank 7 comprising only the two edge panels 11 and not two pairs of edge panels on four sides of the blank 7, two by two parallel and two by two perpendicular. This similar width in question is taken into consideration, involving the edge panel 11, between the bottom fold line 10b and the top supporting edge 12, and involving the spacer panel 13, between the bottom fold line 10a and the top supporting fold line 14.

According to the invention, and in its broadest terms, at least one of the edge panels 11 and/or spacer panels 13 comprises, over its top supporting edge 12, its top supporting fold line 14, at least one projecting part 16a (edge panel 11), 16b (spacer panel 13).

In the embodiment shown, the two edge panels 11 and the two spacer panels 13 of the spacer panel pair 13 each comprise a projecting part 16a, 16b, each of them in two sections 16aa, 16ab, and 16ba and 16bb. This embodiment is only by way of example and is in no way limiting. For the sake of convenience, the description is provided more especially relative to this embodiment, with one skilled in the art easily able to transfer it in the more general case where at least one only of the edge panels 11 and/or of the spacer panels 13 comprises at least one projecting part 16a, 16b, as has been indicated.

A projecting part 16a, 16b extends essentially into the plane of the edge panel 11, the spacer panel 13, transversely, namely in the essentially orthogonal direction and in the direction opposite to the bottom fold line 10b, 10a of the edge panel 11, and of the spacer panel 13.

In contrast, according to the invention, and in its broadest terms, at least one of the receiving panels 9 comprises, adjacent to its bottom fold line 10b, 10a, with an edge panel 11, a spacer panel 13, and at least one through part 17a (edge panel 11), 17b (spacer panel 13). Such a through part (opening, hole, slot) is arranged to make possible an insertion of the spacer panel 13 essentially into the plane of the edge panel 11 in the direction that is essentially orthogonal to the receiving panel 9.

In the embodiment shown, the two receiving panels 9 each comprise a through part 17a, 17b, each of them in two sections 17aa, 17ab and 17ba and 17bb. This embodiment is only by way of example and is in no way limiting. For the sake of convenience, the description is provided more especially relative to this embodiment, with one skilled in the art easily able to transfer it in the more general case where at least one only of the receiving panels 9 comprises at least one through part 17a, 17b, as it has been indicated.

The projecting part 16a, 16b, and the through part 17a, 17b, respectively, are of sizes and are positioned in a relative manner on the top supporting edge 12, the top supporting fold line 14, and the bottom line 10a, 10b in such a way that with the blank 7 being expanded, on the one hand, the projecting part 16a, 16b of this blank 7 engages with a through part 17a, 17b of another similar expanded blank arranged vertically above, and, on the other hand, the through part 17a, 17b of this blank 7 engages with a projecting part 16a, 16b of another similar expanded blank arranged vertically below.

So as to ensure this engagement of the projecting parts 16a, 16b and of the through parts 17a, 17b, the frontal jacket of a projecting part 16a, 16b is lower than the frontal contour of a through part 17a, 17b. In a particular embodiment, this jacket and this contour are adjusted to ensure an engagement without substantial play.

In the embodiment shown, a through part 17a, 17b extends in part over a receiving panel 9 and in part over the edge panel 11 or over the spacer panel 13 that is adjacent to this receiving panel 9. The through part 17a, 17b is thus astride the bottom fold line 10b, 10a between the receiving panel 9 and the edge panel 11 in question or the spacer panel 13 in question. This embodiment is not, however, limiting.

In the embodiment shown, a projecting part 16a, 16b, a through part 17a, 17b, has, in elevation, a general shape of a polygon or is integrated into a jacket that has a general shape of a polygon, in particular a general shape of a rectangle (for example, a square shape). In addition, in the embodiment shown, a projecting part 16a, 16b and a through part 17a, 17b have, in elevation, a similar shape. These embodiments are not, however, limiting.

As already indicated, a projecting part 16a, 16b, and a through part 17a, 17b, can have several sections 16aa, 16ab, 16ba, 16bb, 17aa, 17ab, 17ba, 17bb. These different sections of projecting part 16a, 16b or through part 17a, 17b are similar, coplanar, and spaced along the longitudinal direction. In an embodiment, the projecting part(s) 16a, 16b and the through part(s) 17a, 17b all have the same number of sections. Thus, in the embodiment shown, each projecting part 16a, 16b and each through part 17a, 17b is in two sections. This embodiment is not, however, limiting.

In contrast, according to an embodiment, the sections of a projecting part 16a, 16b or a through part 17a, 17b are spaced and essentially also distributed along the top supporting edge 12, the top supporting fold line 14, or the bottom fold line 10a, 10b, where they are located.

So as to illustrate the embodiment, it may be indicated that a projecting part 16a, 16b extends from the top supporting edge 12 or from the top supporting fold line 14 where it is located and in the essentially orthogonal direction and in the direction opposite to the bottom fold line 10b of the edge panel 11 or the spacer panel 13 that comprises it, over a length that is a small fraction of the transverse width of the edge panels 11 and the spacer panels 13. In particular, this fraction is between 5% and 30%, and more especially between 10% and 20%. These embodiments are not, however, limiting.

As always, so as to illustrate the embodiment, it can be indicated that a projecting part 16a, 16b and/or a through part 17a, 17b—in one or more sections—extends in total along the top supporting edge 12, the top supporting fold line 14, and the bottom fold line 10a, 10b where it is located, over a length that is a fraction of the length of said top supporting edge 12 of said top supporting fold line 14, and said bottom fold line 10a, 10b, as is encompassed between 15% and 35%, and more especially between 18% and 28%. These embodiments are not, however, limiting.

According to the embodiment shown, the projecting part 16b of the first spacer panel 13 of a pair of spacer panels 13 is delimited and formed by a scalloping of the second spacer panel 13 of the same pair of spacer panels 13. With such an embodiment, the top supporting fold line 14 between the first spacer panel 13 and the second spacer panel 13 is interrupted in the projecting part 16b. This embodiment is not, however, limiting.

The embodiment of the projecting parts 16a, 16b and through parts 17a, 17b is such that the stability of the superposition of two packages 4 is excellent, which allows projecting parts 16a, 16b that extend from the top supporting edge 12 or the top supporting fold line 14 over a small length that is a very small fraction of the transverse width of the edge panels 11 and the spacer panels 13.

According to the embodiment shown, the receiving panels 9 comprise one or more cut-out segments 18 delimiting one or more flaps 18a. With the blank 7 being expanded, the flap(s) 18a is/are set up relative to the receiving panels 9 in the same direction as the edge panels 11 and the spacer panels 13. This or these flaps 18a have as their function to wedge the objects 1 toward their bottom walls 2b. Of course, the arrangement and the number of cut-out segments are adapted to the shape and the number of containers 1a or the like forming an object 1. This embodiment is not, however, limiting.

According to the embodiment shown, the two edge panels 11 comprise an opening 19. With the blank 7 being expanded, the two openings 19 have as their function to promote aeration (which is important in the case of contents that have to be kept fresh) and/or have as their function to make possible the gripping of the bundle 3. This embodiment is not, however, limiting.

According to the embodiment shown, and in a similar manner, the two spacer panels 13 of the pair of spacer panels 13 comprise openings 20, being mated in the expanded blank 7. These openings 20 have as their function to promote aeration. This embodiment is not, however, limiting.

The flat blanks 7 shown in FIGS. 1 and 3 are similar except that, relative to FIG. 1, the blank 7 is provided for a single layer of objects 5, with this layer comprising two objects 1, each consisting of four jars 1a or the like over two longitudinal rows and two transverse rows, or eight jars 1a in all or the like, while, relative to FIG. 3, the blank 7 is provided for two layers of objects 5, each comprising two objects 1, each consisting of four jars 1a or the like over two longitudinal rows and two transverse rows, or 16 jars 1a in all or the like. These embodiments are not, however, limiting.

Such a flat blank 7 can be expanded, as shown in FIGS. 4, 5, 7 and 8.

In this case, the two receiving panels 9 are arranged in a manner that is at least essentially coplanar and side by side transversely, in particular are arranged at least essentially horizontally, in such a way as to form an inside and lower support surface for receiving objects 1, with the objects 1 thus resting on their first surfaces of the receiving panels 9.

The two edge panels 11 are arranged in a manner that is at least essentially orthogonal to the receiving panels 9, in particular are arranged at least essentially vertically.

The two spacer panels 13 of the pair of spacer panels 13 are arranged against one another by their second surfaces 7b and in a manner that is at least essentially orthogonal to the receiving panels 9 and in the same direction as the two edge panels 11, in particular are arranged at least essentially vertically.

The projecting parts 16a, 16b extend essentially into the plane of the edge panel 11, the spacer panel 13, comprising it, in the direction that is essentially orthogonal and in the direction opposite to the bottom fold line 10b, 10a of the edge panel 11 in question, of the spacer panel 13 in question. These projecting parts 16a, 16b are located in the upper part of the expanded blank 7 and are directed upward. Conversely, the through parts 17a, 17b are located in the lower part of the expanded blank 7.

With such an expanded blank 7, and in the embodiment shown, there are two openings 15a on both sides over the two sides perpendicular to the edge panels 11 because there are only two edge panels and not four.

Such an expanded blank 7 makes it possible to produce the package 4 that comprises, in combination, this expanded blank 7 and the cap 8, which are rigidly secured to one another head to foot in such a way as to keep the jars 1a or the like in position.

In the package 4, the receiving panels 9 have the function of forming an inside and lower support surface for receiving objects 1; the two edge panels 11 have the function of forming, on each side of one—and as shown only one—pair of sides, a lateral edge of objects 1 toward the outside of the package 4; and the spacer panels 13, located inside the package 4 have the function of forming a lateral edge of objects 1 toward the inside. In addition, the edge panels 11 and the spacer panels 13 ensure the resistance of the bundle 3 to compression (in the vertical direction) by forming types of beams, the latter being distributed, both laterally (edge panels 11) and in the median (spacer panels 13). As for the projecting parts 16a, 16b and the through parts 17a, 17b, they have the function of ensuring the stability of the superposition of two packages 4. As for the two openings 15a on both sides over the two sides perpendicular to the edge panels 11, they have the functions of making possible the display of the jars 1a or the like and their ventilation.

With reference most particularly to FIGS. 2, 4 and 5, the cap 8 is now most especially described.

Firstly, the cap 8 comprises an upper cover part 21, located vertically above the pair of receiving panels 9.

The cover part 21 engages with, and in particular is supported on, the two top supporting edges 12 of the two edge panels 11 and the top supporting fold line 14 of the spacer panels 13, which edges and lines 12, 13 are at least essentially coplanar and in an at least essentially horizontal plane, as disclosed above.

With this arrangement, the receiving panels 9 and the cap 8 delimit between them an object for packaging space 22. This object packaging space 22 comprises, in the embodiment shown, two compartments 22a, 22b, arranged side by side transversely. These two compartments 22a, 22b are separated from one another by the pair of spacer panels 13 arranged against one another. The two compartments 22a, 22b are thus capable of receiving two objects 1. The two compartments 22a, 22b are equipped with two openings on both sides over the two sides perpendicular to the edge panels 11. The embodiment that is described can be generalized, with the object packaging space 22 able to comprise a larger number of compartments such as 22a, 22b, according to the number of pairs of spacer panels 13.

Secondly, the cap 8 comprises an engagement part 23, secured to the expanded blank 7, in particular secured to the two edge panels 11.

Thirdly, the cap 8 houses cap passages 24 for the passage of the projecting parts 16a and 16b of the expanded blank 7. In the thus produced package 4, the projecting parts 16a and 16b of the expanded blank 7 project above the cover part of the cap.

In contrast, in the package 4, the through parts 17a and 17b of the expanded blank 7 are left free and uncovered but are not hidden from view in such a way as to be able to receive projecting parts 16a and 16b of another package placed below the one in question.

The cap 8 can be the object of different embodiments.

In the embodiment shown in FIGS. 2, 4 and 5, the cap 8 is formed by an expanded blank, of the cardboard type or the like, with a cover panel 21 and two—and in the embodiment shown only two—lateral and similar engagement folds 23, located on both sides of the cover panel 21 and connected to the latter by two cap fold lines 25.

The two folds 23 come against the two edge panels 11 of the expanded blank 7, typically toward the outside of the package 4, and are secured to the two edge panels 11, for example by gluing, welding, stapling or the like. Since, in the embodiment shown, the blank 7 comprises only two edge panels and not four, as for a container, the cap 8 itself comprises only two folds 23 and not four, in such a way as to leave free the two openings 15a on both sides over the two sides perpendicular to the edge panels 11.

The cover panel 21 comprises cap passages 24 in the form of cap through parts 24. These cap through parts 24 are located, on the one hand, adjacent to the cap fold line 25 and, on the other hand, facing a pair of spacer panels 13 of the expanded blank 7.

The cap through parts 24 and the projecting parts 16a and 16b of the expanded blank 7 are respectively of sizes and are positioned in a relative manner such that a projecting part 16a, 16b of the expanded blank 7 passes through a cap through part 24 and projects from the outside and upper surface 26 of the cover panel 21 of the cap 8. This embodiment is only an example and is in no way limiting, with one skilled in the art easily able to transfer it in the more general case relative to the blank 7, relating in particular to the number and the arrangement of the spacer panels 13 and to the number and the arrangement of the projecting parts 16a, 16b.

In line with what was disclosed above for the blank 7 and in accordance with the embodiment shown, the frontal jacket of a projecting part 16a, 16b of the expanded blank 7 is lower than the frontal contour of a cap through part 24 in such a way as to ensure their engagement. In particular, this jacket and this contour are adjusted to ensure an engagement without substantial play. This embodiment is not, however, limiting.

In the embodiment shown, the cap 8 comprises cap through parts 24 in an equal number and with an arrangement that is similar to the projecting parts 16a and 16b of the expanded blank 7. This embodiment is not, however, limiting.

In line with the through parts 17a and 17b of blank 7, and in accordance with the embodiment shown, the cap through parts 24 extend in part over the cover panel 21 of the cap 8 and in part over a fold 23 of the cap 8, by consequently being astride their corresponding cap fold line 25. This embodiment is not, however, limiting.

In line with the blank through parts 17a and 17b, and in accordance with the embodiment shown, the cap through parts 24 are in multiple similar sections, spaced, engaging with a projecting part 16a, 16b of the expanded blank 7 that is itself in multiple sections. This embodiment is not, however, limiting.

As is shown in FIG. 5, the cover panel 21 of the cap 8 comprises one or more cut-out segments 27, delimiting one or more parts 27a that can be set up above the cover panel 21 for the purpose of forming a gripping means. This embodiment is not, however, limiting.

As is also shown in FIG. 5, the folds 23 of the cap 8 comprise openings 28 that can be aligned with the openings for aeration and/or gripping 19 of the expanded blank 7. This embodiment is not, however, limiting.

As is also shown in FIG. 5, the cap 8 does not project from the expanded blank 7 from one side or the other in the longitudinal direction where the openings are, i.e., beyond its free edges 15. This embodiment is not, however, limiting.

In other embodiments that can be considered, the cap 8 is formed by a stretched belt or link segment comprising at least one cover part 21 and two folds 23, or by a sheath segment or a segment with a link closed on itself comprising at least one cover part 21, a lower part, and two folds 23, with the belt or link segment or the sheath segment or segment with a link closed on itself being secured to the expanded blank 7 by gluing, welding, stapling, or the like. These other embodiments have the characteristics and the advantages indicated above relative to the embodiment of the cap 8 that is shown.

Such a package 4 makes it possible to produce a bundle 3 comprising such a package 4 and at least one layer 5 of at least two objects 1.

Such a bundle 3 is more especially shown in FIG. 5 and in FIG. 7.

The lower layer of objects 5 rests by its lower surface 6b on the inside and lower support surface of the receiving panels 9. The two edge panels 11 form a lateral edge of the objects 1 toward the outside, on each side of a pair of sides of the bundle 3. The spacer panels 13 form a lateral edge of the objects 1 toward the inside. The two objects 1 are located in the two compartments 22a and 22b, separated by a pair of spacer panels 13. In the embodiment shown in FIGS. 5 and 7, the bundle 3 is closed on two parallel sides where the edge panels 11 and the folds 23 are located and is open on the other two sides perpendicular to the edge panels 11 and to the folds 23, via the openings 15a.

In such a bundle 3, the space requirement of the layer(s) of objects 5 in the direction that is orthogonal to the receiving panels 9 and to the cover part 21 of the cap (vertical axial direction) and between the lowermost surface 6b and the uppermost surface 6c of the layer(s) of objects 5 is similar to—or at most equal to—the spacing between the lower and upper surfaces of the receiving panels 9 forming the inside and lower support surface and the inside and lower surface of the cover part 21. Thus, the inside and lower surface of the cover part 21 comes against or is in the vicinity, in particular the immediate vicinity, of the upper surface 6c of the upper layer of objects 5, with the projecting part(s) of the expanded blank projecting above the cover part of the cap.

FIG. 7 illustrates eight possible variants of bundles 3 according to the invention, according to eight different, non-limiting configurations. From left to right, there is thus shown:

A package 3a with eight jars or the like in a single layer, each layer comprising two packs of four jars or the like each, in a 2×2 arrangement, A package 3b with 16 jars or the like in two layers of eight jars, each layer comprising two packs of four jars or the like each, in a 2×2 arrangement, A package 3c with 12 jars or the like in a single layer, with each layer comprising two packs of six jars or the like each, in a 2×3 arrangement, A package 3d with 24 jars or the like in two layers of 12 jars, each layer comprising two packs of six jars or the like each, in a 2×3 arrangement, A package 3e with 16 jars or the like in a single layer, each layer comprising two packs of eight jars or the like each, in a 2×4 arrangement, A package 3f with 32 jars or the like in two layers of 16 jars, each layer comprising two packs of eight jars or the like each, in a 2×4 arrangement, A package 3g with 28 jars or the like in a single layer, each layer comprising two packs of 12 jars or the like each, in a 2×6 arrangement, A package 3h with 48 jars in two layers of 24 jars or the like, each layer comprising two packs of 12 jars or the like each, in a 2×6 arrangement.

As shown in FIG. 6, the invention relates to a palletized load of objects 29, comprising a pallet 29a on which rest bundles 3, as have been described above.

These bundles 3 are arranged beside one another and stacked on one another vertically. The outside and lower surface of the receiving panels 9 of an upper bundle 3 rests on the outside and upper surface of a cover part 21 of a lower bundle 3. And the projecting parts 16a, 16b directed upward of a lower bundle 3 engage with the through parts 17a, 17b of an upper bundle 3.

The embodiment of such a palletized load 29 is possible, without the necessity for additional package means of each bundle 3 or of multiple bundles 3 arranged side by side.

Thus, the package 4 makes it possible for it alone to create a bundle 3 and to ensure the function of making it possible to group and to maintain a number of jars 1a or the like arranged in multiple objects 1, to transport them, if necessary, in the form of a palletized load 29, to present them for sale to the buyer, to make it possible for the buyer to pick them up and handle them. The manufacturer of the product in the jars 1a or the like produces bundles 3, which are subsequently most often palletized, to form palletized loads 29 sent to the points of sale. At the point of sale, the bundles 3 are removed from the palletized load 29 and can be placed directly on the shelf for display and sale. And the buyer picks up one or more bundles 3.

With a package 4 and a bundle 3 as described, a package system for one or more layers of objects 1 is created, according to the definition that was given to this term, more especially comprising jars 1a or the like that at the same time makes it possible to have jars 1a or the like with a smaller thickness than that of the known jars 1a, for example with a thickness that is less than approximately 0.7 mm, 0.8 mm, to have a smaller consumption of package material for the creation of the blank 7 and the cap 8, and to have an excellent resistance to compression, with the jars 1a or the like not absorbing the compression forces, applied to the edge panels 11 and to the spacer panels 13. Such a multi-purpose package 4 makes it possible to eliminate excessive packages. Depending on what is wanted, the jars 1a or the like may or may not be encased by a jacket. The display of the jars 1a or the like is facilitated. The management of the packages on the points of sale is very reduced. In the case where multiple layers of bundles 3 are superposed and stacked, they cannot be moved relative to one another. The ventilation of the jars 1a or the like is preserved and even improved. Such a package 4 and such a bundle 3 provide convenience and visibility. They can comprise one or more carrying handles.

Taking into account that the term "jar" is in no case limiting, what has been said on this subject applies to a primary package being part of the bundle 3. Thus, such a primary package can have reduced thickness, just enough to contain its contents, since the primary package is not subjected to compression forces.

The invention also has as its object the process for the production of a bundle 3, as it was described, and an installation for the implementation of this process. Reference is made in particular to FIGS. 8 and 9, which are similar, with FIG. 8 more especially illustrating the process and FIG. 9 more especially illustrating the installation.

In the process, first of all, at least two objects 1 are available, a flat blank 7 is available, and a cap 8 is available, and this is accomplished by means that can be stationary, such as storage units with which are combined handling means such as robots or the like, or moving means such as conveyors.

For example, it is possible to provide a general conveyor 30 with, upstream, a storage unit 31a for the flat blanks 7 and a robot 31b (of which only the head is depicted diagrammatically) that can deposit flat blanks 7, successively, on the conveyor 30 toward an upstream position 30a (reference A in FIG. 8).

Toward an intermediate position 30b of the general conveyor 30, it is also possible to provide an intake 32a of objects 1, such as the downstream end of a conveyor of objects 32b and a robot 32c (of which only the head is depicted diagrammatically) that can deposit objects, successively, on the blanks 7 carried by the conveyor 30 toward the intermediate position 30b (reference B in FIG. 8).

Toward a downstream position 30c of the general conveyor 30, it is also possible to provide a storage unit 33a for the flat caps 8 and a robot 33b (of which only the head is depicted diagrammatically) that can deposit flat caps 8, successively, on the objects 1 that are themselves carried by the blanks 7 that are carried and driven by the conveyor 30 from upstream to downstream (reference C in FIG. 8).

The blank 7 that was flat is shaped, and the objects 1 are placed in such a way as to form at least one layer 5 of at least two objects 1, with the lower layer of objects 5 resting on the inside and upper support surface of the receiving panels 9, and with another layer of objects 5 being superposed on the lower layer. These stages can more or less overlap. The different operations relating to the expanding of the blank 7 and the arrangement of the objects 1 overlap with one another.

For example, in a first operation (reference D in FIG. 8), the spacer panels 13 are set up, and for this purpose, they are made to pivot around the two fold lines 10a and the top supporting fold line 14 in such a way that the two spacer panels 13 are arranged against one another by their second surfaces 7b and in a manner that is at least essentially parallel to the edge panels 11, and this is accomplished by means that can be, for example, shaped ramps, moving pushers, clamps 34 arranged downstream from the upstream position 30a and on both sides of the conveyor 30, with the spacer panels 13 being arranged axially and longitudinally relative to the conveyor 30.

Then, in a second operation, downstream from the preceding one, the objects 1 are arranged on the thus partially shaped blank 7, by means of the robot 32c that is arranged downstream from the ramps, pushers, clamps 34.

Then, in a third operation, downstream from the preceding one, the two edge panels 11, arranged laterally on both sides of the conveyor 30, are set up, and for this purpose, they are made to pivot around the two fold lines 10b, and this is accomplished by means that can be, for example, shaped ramps, moving pushers, clamps 35 arranged downstream from the robot 32c and on both sides of the conveyor 30.

Next, the cap 8 is placed on the expanded blank 7, head to foot, with the cover part 21 being placed vertically above the receiving panels 9, the inside and lower surface of the cover part 21 coming against or in the vicinity of the upper surface 6c of the upper layer of objects 5, the cover part 21 engaging with the top supporting edges 12, and the top supporting fold line(s) 14 of the edge panels 11 and the spacer panels 13, the projecting part(s) 16a, 16b of the expanded blank 7 projecting above the cover part 21 of the cap 8, and the cap 8 is secured to the expanded blank 7.

The different operations relating to the arrangement and the expanding of the cap 8 and its engagement with the expanded blank 7 are overlapped with one another.

For example, in a first operation, the caps 8 are picked up from the storage unit 33a by the robot 33b.

Then, in a second operation, the glue or another engagement means is used on the surfaces to be secured of the edge panels 11 and folds 23 by means of a suitable device.

Then, in a third operation, the cap 8 is engaged with and on the expanded blank 7 bearing the objects 1, and this is accomplished by means that can be, for example, shaped ramps, moving pushers 36 arranged toward the downstream position 30c and on both sides of the conveyor 30.

At the outlet downstream from the conveyor 30, the bundles 3 that are produced are recovered during the process.

The preceding description of both the process and the installation is purely by way of example and non-limiting, taking into account, in particular, variant structural embodiments of the bundles 3 and numerous means that can be used for the operations of movement, folding, engagement . . . that the process involves.

To create a palletized load 29, a pallet 29a and bundles are available.

In a known manner or within the scope of one skilled in the art, the bundles 3 are placed on the pallet 29a, beside one another and stacked vertically on one another.

The process is noteworthy in that there is no need for additional package means of each bundle 3 or of multiple bundles 3 arranged side by side.

The invention claimed is:

1. A flat blank (7), capable of, once assembled and combined and made integral with a cap (8), forming a package (4) for at least one layer (5) of at least two objects (1), with the flat blank (7) being cardboard or the like with a number of strong panels, a number of fold lines parallel to a longitudinal direction (L) connecting adjacent panels, a first surface (7a) and a second surface (7b), including:
at least one pair of two panels (9) for receiving objects (1), each delimited transversely by two bottom fold lines (10b), able to be arranged in the assembled blank (7) in an at least essentially coplanar manner and side by side transversely, in such a way that the objects (1) can rest on their first surfaces (7a),
two similar outside edge panels (11), arranged laterally, each delimited transversely by a bottom fold line (10b) and a top supporting edge (12), each connected to a receiving panel (9) by a bottom fold line (10b) that can be arranged in the assembled blank (7) in an at least essentially parallel manner between them and orthogonal to the receiving panels (9),
at least one pair of two similar internal spacer panels (13), arranged in the median, each delimited transversely by a bottom fold line (10a) and a top supporting fold line (14), connected to one another by said top supporting fold line (14) and connected to two receiving panels (9) by two bottom fold lines (10a) that can be arranged in the assembled blank (7) against one another by their second surfaces (7b) and in a manner that is at least essentially parallel to the edge panels (11), with the edge panels (11) and the spacer panels (13) having the same orientation relative to the receiving panels (9) and between their bottom fold line (10b, 10a) and either their top supporting edge (12) or their top supporting fold line (14), a similar transverse width, wherein:
at least one of the edge panels (11) and at least one of the spacer panels (13) comprises, over a top supporting edge (12), a top supporting fold line (14), at least one projecting part (16a, 16b) extending essentially in the plane of said edge panel (11), of said spacer panel (13), in the essentially orthogonal direction and in the direction opposite to the bottom fold line (10b, 10a) of said edge panel (11), of said spacer panel (13),
at least one of the receiving panels (9) comprises, adjacent to a bottom fold line (10b, 10a) with an edge panel (11), a spacer panel (13), at least one through part (17a, 17b) for an insertion essentially into the plane of said edge panel (11), of said spacer panel (13), and in the direction that is essentially orthogonal to said receiving panel (9),
the projecting part (16a, 16b) and the through part (17a, 17b), respectively, are of sizes and are positioned in a relative manner on the top supporting edge (12), the top supporting fold line (14), and the bottom line (10a, 10b), in such a way as to be able, with said blank (7) being assembled, to engage respectively with a through part (17a, 17b) of another similar assembled blank (7) arranged vertically above and with a projecting part (16a, 16b) of another similar assembled blank (7) arranged vertically below.

2. The flat blank (7) according to claim 1, wherein the frontal jacket of a projecting part (16a, 16b) is lower than the frontal contour of a through part (17a, 17b) in such a way as to ensure their engagement, in particular said jacket and said contour are adjusted to ensure their engagement without substantial play.

3. The flat blank (7) according to claim 1, wherein a through part (17a, 17b) extends in part over a receiving panel (9) and in part over the edge panel (11) or over the spacer panel (13) that is adjacent to said receiving panel (9), astride the bottom fold line (10b, 10a) between the receiving panel (9) and said edge panel (11) or said spacer panel (13).

4. The flat blank (7) according to claim 1, wherein a through part (17a, 17b), a projecting part (16a, 16b), has, in elevation, the general shape of a polygon or is integrated into a jacket in the general shape of a polygon, in particular a general shape of a rectangle or square; in particular, a through part (17a, 17b) and a projecting part (16a, 16b) have a similar shape in elevation.

5. The flat blank (7) according to claim 1, wherein at least one of the edge panels (11) and at least one of the spacer panels (13) comprise at least one projecting part (16a, 16b) and at least one through part (17a, 17b).

6. The flat blank (7) according to claim 1, wherein the two edge panels (11) and/or the two spacer panels (13) comprise at least one projecting part (16a, 16b) and at least one through part (17a, 17b).

7. The flat blank (7) according to claim 1, wherein a projecting part (16a, 16b) or a through part (17a, 17b) is in multiple similar sections (16aa, 16ab, 16ba, 16bb, 17aa, 17ab, 17ba, 17bb), coplanar, spaced along the longitudinal direction (L), in particular is in two sections; and in particular wherein the projecting part(s) (16a, 16b) and the through part(s) (17a, 17b) of the blank (7) all have the same number of sections.

8. The flat blank (7) according to claim 7, wherein the sections (16aa, 16ab, 16ba, 16bb, 17aa, 17ab, 17ba, 17bb) of a projecting part (16a, 16b) or a through part (17a, 17b) are spaced and essentially also distributed along the top supporting edge (12), the top supporting fold line (14), or the bottom fold line (10b, 10a), where they are located.

9. The flat blank (7) according to claim 1, wherein a projecting part (16a, 16b) extends from the top supporting edge (12) or the top supporting fold line (14) where it is located and in the direction that is essentially orthogonal and in the direction opposite to the bottom fold line (10b, 10a) of the edge panel (11) or the spacer panel (13) that comprises it, over a length that is a small fraction of the transverse width of the edge panels (11) and spacer panels (13), of between 5% and 30%.

10. The flat blank (7) according to claim 1, wherein a projecting part (16a, 16b) and/or a through part (17a, 17b), in one or more sections, extends in total along the top supporting edge (12), the top supporting fold line (14), and the bottom fold line (10b, 10a) where it is located, over a length that is a fraction of the length of said top supporting edge (12), said top supporting fold line (14), and said bottom fold line (10b, 10a), of between 15% and 35%.

11. The flat blank (7) according to claim 1, wherein the projecting part (16b) of the first spacer panel (13) of a pair of spacer panels (13) is delimited and formed by a scalloping of the second spacer panel (13) of the pair of spacer panels (13), with the top supporting fold line (14) between the first spacer panel (13) and the second spacer panel (13) being interrupted in said projecting part (16b).

12. The flat blank (7) according to claim 1, wherein on their two edges (15) arranged essentially parallel to the transverse direction (T), the receiving panels (9) are lacking edge panels.

13. The flat blank (7) according to claim 1, wherein at least one—and in particular all—of the receiving panels (9) comprise(s) one or more cut-out segments (18) delimiting one or more flaps (18a), able, with the blank (7) being assembled, to be set up relative to the receiving panels (9) in the same direction as the edge panels (11) and the spacer panels (13) for the purpose of wedging the objects (1).

14. The flat blank (7) according to claim 1, wherein at least one—and in particular the two—edge panel(s) (11) comprise(s) at least one opening (19) that is capable of—with the blank (7) being assembled—aeration and/or gripping.

15. The flat blank (7) according to claim 1, wherein at least one—and in particular the two—spacer panel(s) (13) of at least one pair of spacer panels (13) comprise(s) at least one opening (20) that is capable of—with the blank (7) being assembled—aeration.

16. An assembled blank (7), capable of being part of a package (4), being combined and made integral with a cap (8), created by the expanding of a flat blank (7) according to claim 1, in which:
the two receiving panels (9) of the at least one pair of receiving panels (9) are arranged in an at least essentially coplanar manner and side by side transversely, in particular are arranged at least essentially horizontally, in such a way that the objects (1) can rest on their first surfaces (7a),
the two edge panels (11) are arranged in an at least essentially orthogonal manner to the receiving panels (9), in particular are arranged at least essentially vertically,
the two spacer panels (13) of the at least one pair of spacer panels (13) are arranged against one another by their second surfaces (7b) and in a manner that is at least essentially orthogonal to the receiving panels (9) and in the same direction as the two edge panels (11), in particular are arranged at least essentially vertically,
the projecting part (16a, 16b) extends essentially in the plane of the edge panel (11), of the spacer panel (13), comprising, in the essentially orthogonal direction and in the direction opposite to the bottom fold line (10b, 10a) of said edge panel (11), of said spacer panel (13), in particular is located in the upper part of the assembled blank (7) and is directed upward, with the through part (17a, 17b) being located in the lower part of the assembled blank (7).

17. A package (4) for at least one layer (5) of at least two objects (1) comprising in combination an assembled blank (7) according to claim 16 and a cap (8), rigidly made integral with one another head to foot and in which:
the receiving panels (9) form an inside and lower support surface for receiving objects (1), the edge panels (11) form a lateral edge of the objects (1) toward the outside, and the spacer panels (13) form a lateral edge of the objects (1) toward the inside,
the cap (8) comprises an upper cover part (21), located vertically above the at least one pair of receiving panels (9) and said cover part (21) engages with, in particular rests on, the top supporting edges (12) and the top supporting fold line(s) (14) of the edge panels (11) and the spacer panels (13),
the receiving panels (9) and the cap (8) delimit between them an object (1) package space (22), and said object (1) package space (22) comprises at least two compartments (22a, 22b) that are transversely side by side, separated from one another by at least one pair of spacer panels (13) arranged against one another, with the at least two compartments (22a, 22b) being capable of receiving the at least two objects (1),
the cap (8) comprises an engagement part (23) made integral with the assembled blank (7), in particular made integral with the edge panels (11),
the cap (8) houses one or more cap passages (24) for the passage of the projecting part(s) (16a, 16b) of the assembled blank (7), which projecting part(s) (16a, 16b) of the assembled blank (7) project above the cover part (21) of the cap (8).

18. The package (4) according to claim 17, wherein the cap (8) is formed by an assembled blank, of the cardboard type or the like, with a cover panel (21) and two similar lateral engagement folds (23), located on both sides of the cover panel (21) and connected to the latter by two cap fold lines (25), with the two folds (23) coming against and being made integral with two edge panels (11) of the assembled blank (7), the cover panel (21) comprising at least one cap passage (24) in the form of a through part of the localized cap (8) adjacent to the cap fold line (25) of the cover panel (21) with at least one fold (23) and/or localized facing a pair of spacer panels (13) of the assembled blank (7), with the cap through part (24) and a projecting part (16a, 16b) of the assembled blank (7) being respectively of sizes and being positioned in a relative manner such that a projecting part (16a, 16b) of the assembled blank (7) passes through a cap through part (24) and projects from the outside surface of the cover panel (21) of the cap (8).

19. The package (4) according to claim 18, wherein the cover panel (21) of the cap (8) comprises at least one cap through part (24) adjacent to said cap fold line (25), in particular to two cap fold lines (25), and at least one cap through part (24) facing a pair of spacer panels (13), in particular each pair of spacer panels (13).

20. The package (4) according to claim 18, wherein the frontal jacket of a projecting part (16a, 16b) of the assembled blank (7) is lower than the frontal contour of a cap through part (25) in such a way as to ensure their engagement; in particular, said jacket and said contour are adjusted to ensure their engagement without substantial play.

21. The package (4) according to claim 18, wherein the cap (8) comprises cap through parts (25) that are equal in number and with an arrangement that is similar to the projecting parts (16a, 16b) of the assembled blank (7).

22. The package (4) according to claim 18, wherein a cap through part (25) extends in part over the cover panel (21) of the cap (8) and in part over a fold (23) of the cap (8), astride their corresponding cap fold line (25).

23. The package (4) according to claim 18, wherein a cap through part (24) is in multiple spaced similar sections, engaging with a projecting part (16a, 16b) of the assembled blank (7) in multiple sections.

24. Package (4) according to claim 18, wherein the cover panel (21) of the cap (8) comprises one or more cut-out segments delimiting one or more parts that can be set up above the cover panel (21) for the purpose of forming a gripping means.

25. Package (4) according to claim 18, wherein at least one—and in particular two—cap fold(s) (8) comprise(s) at least one opening (28) that can be aligned with an opening (19) for aeration and/or an opening (19) for gripping of the assembled blank (7).

26. Package (4) according to claim 18, wherein the assembled blank (7) and the cap (8) are made integral by gluing, welding, stapling, or the like.

27. The package (4) according to claim 18, wherein the cap (8) does not project from the assembled blank (7) on one side or the other in the longitudinal direction (L).

28. The package (4) according to claim 17, wherein the cap (8) is formed by a stretched belt or link segment comprising at least one cover part and two folds, or by a sheath segment or a segment with a link closed on itself, comprising at least one cover part, a lower part, and two folds, with the segment of belt or link or sheath or link closed on itself being made integral with the assembled blank (7) by gluing, welding, stapling, clamping, or the like.

29. A bundle (3) comprising a package (4) according to claim 17 and at least one layer (5) of at least two objects (1), with the lower layer (5) of objects (1) resting by its lower surface on an inside and lower support surface formed by the inside and upper surface of the receiving panels (9), with the edge panels (11) forming a lateral edge of objects (1) toward the outside, and the spacer panels (13) forming a lateral edge of the objects (1) toward the inside, with the at least two objects (1) being located in the at least two compartments (22a, 22b) side by side transversely from the object (1) package space (22), separated by a pair of spacer panels (13) arranged one against the other between objects (1), with the space requirement of the at least one layer (5) of objects (1) in the direction orthogonal to the receiving panels (9) and to the cover part (21) of the cap (8), between the lowermost surface and the uppermost surface, being similar to or at most equal to the spacing between the inside and upper surface of the receiving panels (9) and the inside and lower surface of the cover part (21), in such a way that the inside and lower surface of the cover part (21) comes against or is in the vicinity of the upper surface of the upper layer (5) of objects (1), with the projecting part(s) (16a, 16b) of the assembled blank (7) projecting above the cover part (21) of the cap (8).

30. The bundle (3) according to claim 29, wherein it comprises either one or multiple layers (5) of objects (1), with these layers (5) then being superposed, in particular directly superposed.

31. The bundle (3) according to claim 29, wherein an object (1) is a primary package filled with contents, comprising one or more cartons (1a) arranged in multiple longitudinal and/or transverse rows, a carton (1a) having a side wall (2a) in the general shape of a cylinder or prism, a bottom wall (2b) and a top wall (2c), in particular a lid, with several cartons (1a) being connected to one another, in particular toward their top walls (2c).

32. The bundle (3) according to claim 31, wherein an object (1) comprises a peripheral collar, in particular a collar (2d) for connection of several cartons (1a), with the edge ($2^e$) of the collar (2d) coming against the edge panel (11) and/or the spacer panel (13).

33. The bundle (3) according to claim 31, wherein an object (1) is a primary package comprising one or more cartons (1a) arranged in multiple longitudinal and/or transverse rows with a cardboard jacket or the like surrounding the cartons.

34. The bundle (3) according to claim 29, wherein an object (1) is a primary package comprising one or more cartons (1a) with a thickness of less than approximately 0.7 mm, 0.8 mm.

35. A pelletized load (29) of objects (1) comprising a pallet (29a) on which rest a number of bundles (3) according to claim 29, arranged beside one another and stacked on one another vertically, with the outside and lower surface of the receiving panels (9) of an upper bundle (3) resting on the outside and upper surface of a cover part (21) of a lower bundle (3), the projecting parts (16a, 16b) directed toward the top of a lower bundle (3) engaging with the through parts (17a, 17b) of an upper bundle (3), without the necessity for additional package means of each bundle (3) or of multiple bundles (3) placed side by side.

36. A process for the production of a bundle according to claim 29, in which:
 at least two objects (1) are available,
 a flat blank (7) is available,
 a cap (8) is available,
 shaping the blank (7),
 arranging the objects (1) in such a way as to form at least one layer (5) of at least two objects (1), with the lower layer (5) of objects (1) resting on the inside and upper surface of the receiving panels (9), and any other layer (5) of objects (1) being superposed on the lower layer (5), placing the cap (8) on the assembled blank (7) head to foot, with the cover part (21) being placed vertically above receiving panels (9), the inside and lower surface of the cover part (21) coming against or in the vicinity of the upper surface of the upper layer (5) of objects (1), with the cover part (21) engaging with the top supporting edges and the top supporting fold line(s) of the edge panels (11) and the spacer panels (13), with the projecting part(s) (16*a*, 16*b*) of the assembled blank (7) projecting above the cover part (21) of the cap (8), the cap (8) is made integral with the assembled blank (7).

37. The process for the production of a palletized load (29) according to claim 35, wherein:

a pallet (29*a*) is available, bundles (3) are available, and the bundles (3) are placed on the pallet (29a), beside one another, and stacked on one another vertically, without the necessity for additional package means of each bundle (3) or of multiple bundles (3) arranged side by side.

38. An installation for implementing the process for the production of a bundle according to claim 36, which comprises:

means for supplying at least two objects (1), of flat blanks (7), with caps (8), means for shaping blanks (7), means for arranging the objects (1) on the blanks (7), means for arranging a cap (8) on the assembled blank (7) head to foot, and means for making the cap (8) integral with the assembled blank (7).

* * * * *